United States Patent [19]

Husten

[11] Patent Number: 5,449,249
[45] Date of Patent: Sep. 12, 1995

[54] METHODS AND APPARATUS FOR DECONTAMINATION OF SUBSOIL

[76] Inventor: Peter F. Husten, St. Gallerstrasse 1, CH-9548 Jakobstal, Switzerland

[21] Appl. No.: 654,311

[22] Filed: Feb. 12, 1991

[30] Foreign Application Priority Data

Feb. 15, 1990 [DE] Germany ............ 40 04 711.3

[51] Int. Cl.$^6$ ................................................ B09B 3/00
[52] U.S. Cl. .................................. 405/128; 210/247; 210/251; 405/52
[58] Field of Search ............. 405/128, 52; 210/747, 210/748, 751; 55/15, 277

[56] References Cited

U.S. PATENT DOCUMENTS

| | | | |
|---|---|---|---|
| 4,043,913 | 8/1977 | Hintermeister . | |
| 4,333,834 | 8/1982 | Werner . | |
| 4,885,098 | 12/1989 | Bodine | 210/748 X |
| 4,892,664 | 1/1990 | Miller | 210/747 |
| 4,941,135 | 7/1990 | Schran | 210/748 X |
| 4,950,394 | 8/1990 | Bernhardt et al. | 210/170 |
| 5,085,783 | 2/1992 | Feke et al. | 210/748 |

FOREIGN PATENT DOCUMENTS

| | | |
|---|---|---|
| 826801 | 7/1975 | Belgium . |
| 0328035 | 8/1989 | European Pat. Off. . |
| 2466271 | 10/1979 | France . |
| 1112465 | 8/1961 | Germany . |
| 8617775 | 9/1986 | Germany . |
| 2136790 | 9/1984 | United Kingdom . |
| WO80/00335 | 6/1980 | WIPO . |

Primary Examiner—Dennis L. Taylor
Attorney, Agent, or Firm—Baker & Daniels

[57] ABSTRACT

An apparatus for the decontamination of a subsoil formations, whereas groundwater is produced over long periods of time to remove especially the highly volatile halogenated hydrocarbons, causing contaminants to be flushed out and contaminants separated from the groundwater at the surface. In order to also be able to remove contaminants having higher specific gravities and contaminants with a low solubility in water, it is proposed to vibrate the water saturated soil/rock zone by means of an acoustic transmitter. The acoustic transmitter consists of two plate-like elements as membranes between which there is a coil.

8 Claims, 5 Drawing Sheets

METHODS AND APPARATUS FOR DECONTAMINATION OF SUBSOIL

BRIEF SUMMARY OF THE INVENTION

The invention resides in the field of decontamination of the ground, and is related particularly to the removal of contaminants including highly volatile halogenated hydrocarbons. The invention involves such removal by flushing the ground water to the surface and extracting the contaminants by a stripping process.

The method and apparatus are most effective where the contaminated water approaches the surface of the ground, although it is not limited thereto, and where there is less ground water, the method and apparatus are still effective, although the removal of the contaminants requires longer periods of time.

The so-called stripping process heretofore known was relatively slow in the case where contaminants consisted of highly volatile halogenated hydrocarbons, but the present invention overcomes difficulties in that respect.

A principal feature of the invention is the utilization of acoustic pulses directed into the ground, which facilitates and increases the action of the removal steps.

The acoustic pulses are produced by a pulse generator that emits electromagnetic vibrations by means of plates in the step (X) but not in (Y), both identified hereinbelow.

Another important feature of the invention is the utilization of boreholes which may be in the form of wells or shafts, or trenches. The ground water is removed through the boreholes. The acoustic pulses increase the permeability in the ground in the immediate vicinity of the boreholes. In full realization of this phase of the invention, a borehole is first formed in an area considered to have the highest concentration of contaminants. Additional or supplemental holes are provided adjacent the borehole and pressure applied to the supplemental holes to force the ground water into the borehole. In so applying the pressure, compressed air may be used, or water forced under pressure. Another feature is that air may be pumped into certain supplemental holes, and water into others, forming a bubbly mixture into the borehole.

The borehole referred to, which may be considered a central borehole, may alternatively be of elongated shape, in the form of a trench, and the pulsers are spaced along the trench preferably at regular intervals, and the supplementary holes are distributed along the trench, also preferably at regular intervals, between the adjacent pulsers.

Another feature of the invention is that the method and apparatus are effective in those cases where the water table is very deep, and the borehole is not driven down completely below the level of the water table.

The step of immediately removing the contaminated water from the borehole is relatively rapid, while on the other hand the flow of the water in the ground is relatively slow. Thus a piece of apparatus in a borehole would not normally be operated continuously, but only intermittently, because of the relatively wide difference in rate of removal of the water relative to the flow of the ground water.

BRIEF DESCRIPTION OF THE VARIOUS FIGURES OF THE DRAWINGS

FIG. 8 is a view of a different design of acoustic pulser of the comb-type of FIG. 7a.

DETAILED DESCRIPTION

Figure 1:
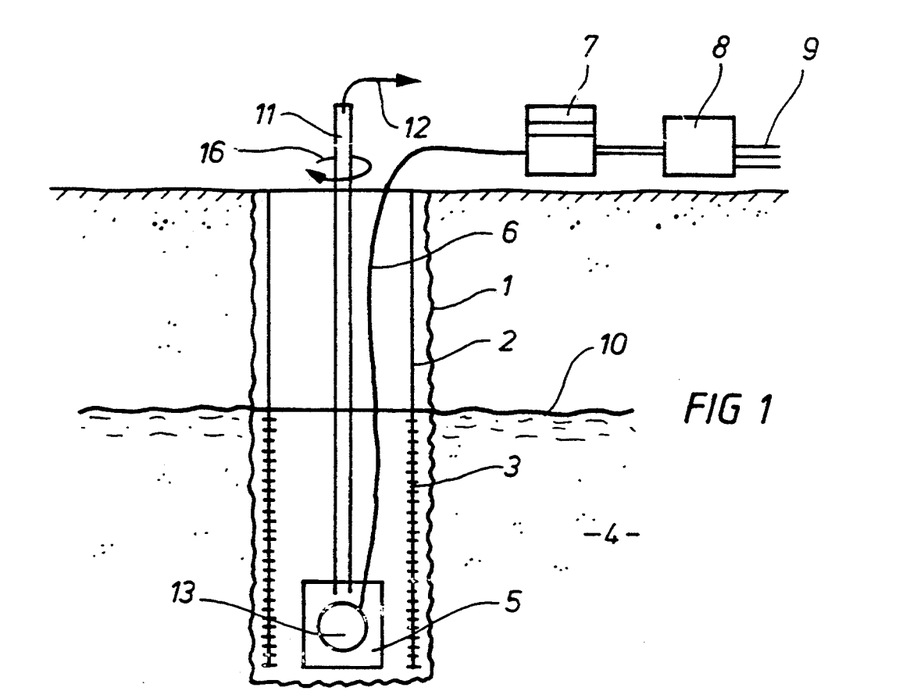
FIG. 1 is a diagrammatic illustration of a borehole and acoustic apparatus.

FIG. 1 shows a borehole 1 in the form of a vertical well or shaft, the deepest point of which is preferably below the surface 10 of the ground water. The borehole has a lining casing 2 which includes a filter portion 3 below the water table.

The water is withdrawn from the borehole through a drill stem 11, at the lower end of which is an acoustic pulser 5, the energy transmitting part of which is a coil 3. A pulse generator 7 is provided on the surface of the ground and connected by a cable 6 with the pulser 5.

The pulser 5 is mounted on the drill stem 11 for rotation, which may be accomplished by rotating the pulser on the stem, or rotating the stem and thus rotating the pulser. A pump indicated diagrammatically at 12 is provided for pumping the water from the borehole.

The acoustic pulser produces a high level of acoustic energy preferably into the borehole 1 and thus into the ground in directly opposite directions. It is not necessary that the entire unit be below the surface of the ground water, but when it is below, the acoustic pulses reach the contaminated areas more completely. The acoustic pulses in the saturated zone progress over great distances, depending on the output power of the pulser. Physical-chemical effects in the ground have been achieved in distances up to 5 m from the pulser. When an acoustic pulser 5 (FIG. 1) is activated below the surface of the ground water, supplementary holes or shafts for the injection of water into the borehole that were provided peripherally to the borehole are not required, because the flow of the ground water under natural action is sufficient.

Figure 4:
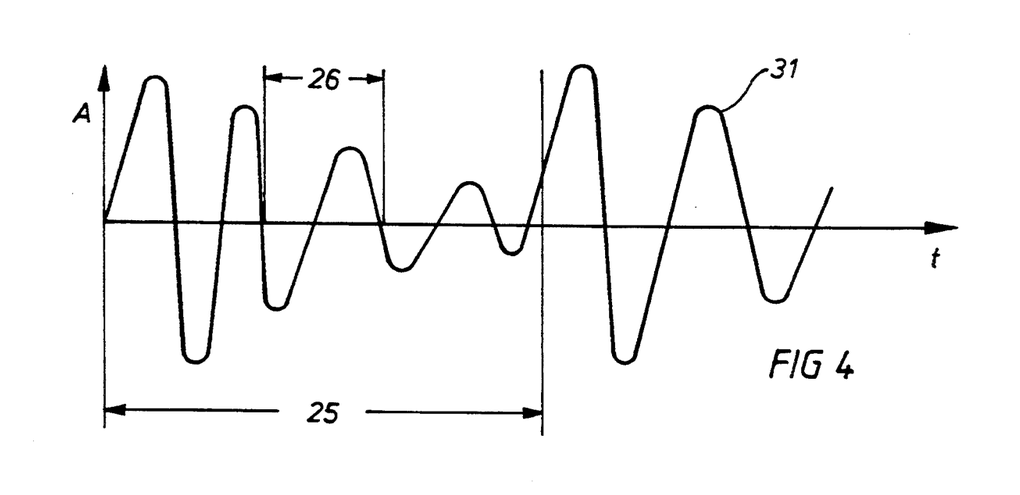
FIG. 4 is wave form of an acoustic pulse and how it is generated by a pulser.
Figure 4A:
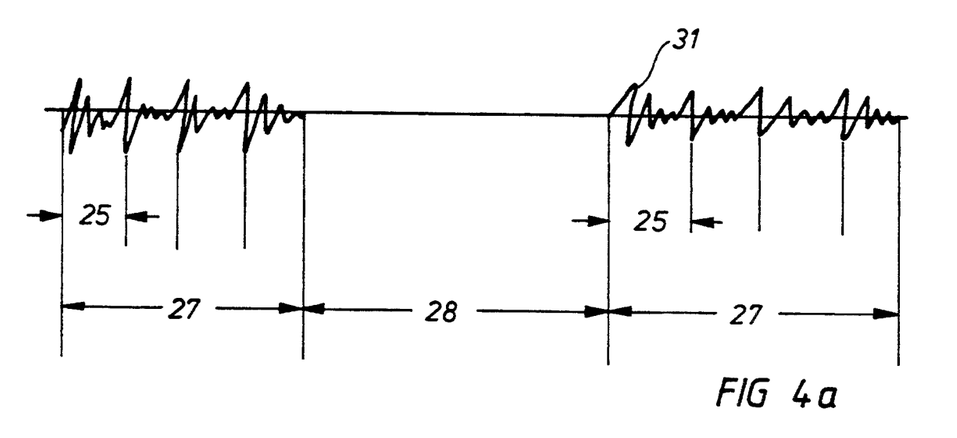
FIG. 4a is a view including a plurality of wave forms of FIG. 4, extended over a greater period of time.

Referring to the repetition of the signals, FIG. 4a is referred to which shows the pulsed wave form 31 in a greater time window, or frame, relative to FIG. 4. A pulsed signal is transmitted during the repetition time period 25 followed by an inactive, idle time 28, after which the same wave form pattern is again generated.

The length of the idle time depends on several factors. One of the factors is the energy consumption of the equipment, and another is the amount of water affected in a particular zone that is subject to acoustic pulses. The flow of ground water through the ground into the borehole is considerably slower than the rate at which the water is pumped out of the borehole, and obviously an idle time ensues. In a case where the effective range of the pulses, for example 5 m, has been cleaned or cleared, additional time is needed to allow further contaminated water to flow into the borehole, from distances farther away. Involved with this phenomenon is the economy of the method of the invention. During this idle time, a different borehole may be utilized, allowing the first borehole to remain idle. The duration of an active acoustic pulsing may be on the order of 0.521 hour, and the idle time lasting several hours. The times 27, 28, i.e. pulsing time and idle time depend also on the permeability of the ground as well as the degree of contamination.

Figure 5:
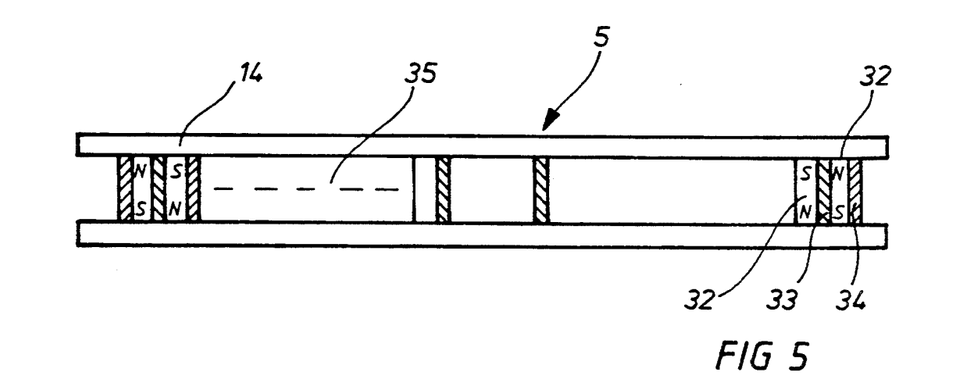
FIG. 5 is a cross-sectional view of an acoustic pulser of a form different from that of FIG. 3.

FIG. 5 shows an additional form of acoustic pulser. In this case the pulser consists of a bifilar coil 35 utilized in the same operating conditions as referred to above in connection with FIG. 3. In this case the pulser has a sealed-off framed casing with parallel membranes 14 opposite each other and spaced apart, and where instead of a simple spirally wound coil as in FIG. 7a, a bifilar wound coil 35 is used. This bifilar coil has the advantage that the direction of the eddy currents can be varied, and also higher concentration of electric flux may be accomplished by adding ferro-magnetic bands 32 to the outer circumference of the bifilar coil 35. A copper band 33 is located with a radial spacing to the ferro-magnetic band 32 as the positive conductor and with a further spacing, again with the ferro-magnetic band 32 in between, a copper band 34 is the negative conductor. The copper bands 33, 34 are part of the bifilar windings of coil 35, as shown in FIG. 7b. In FIG. 7b the connections 29, 30 are both lead out of the coil radially, as contrasted with the arrangement in FIG. 7a where a connection from the center (at 29) has to be made. Also the ferro-magnetic bands 32 are located around the outer circumference of the bifilar coil 35. This is a continuous homogenous ferro-magnetic band that is wound together with the bifilar coil 35. Thus the ferro-magnetic band is parallel with and lies against the length of the bifilar coil 35, which results in an improved induction effect of the coils 35, and improves the efficiency of the push/pull vibrating membrane 14.

Figure 3:
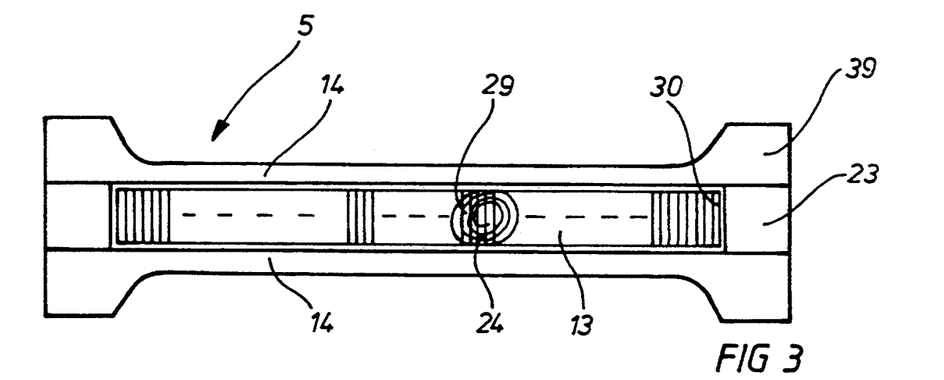
FIG. 3 is a cross-sectional view through an acoustic pulser having spiral coils.
Figure 6:
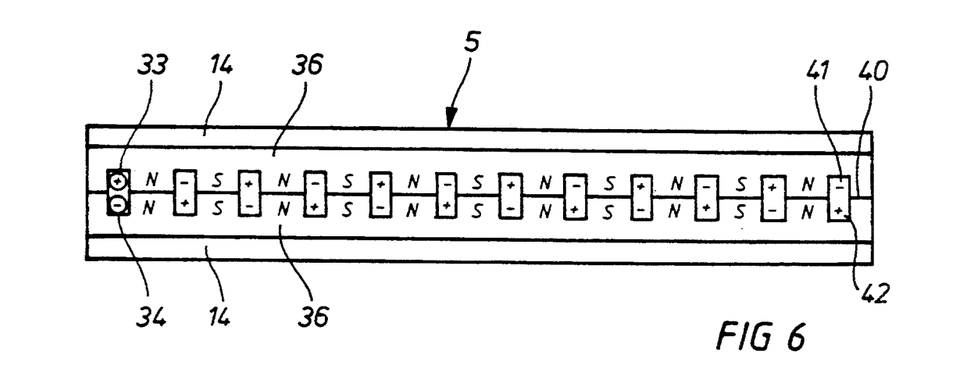
FIG. 6 is a view similar to FIG. 5 showing still another form of acoustic pulser.

FIG. 6 shows a further form of an acoustic pulser having a casing of FIGS. 3 and 5.

In FIGS. 1-5, the design has the purpose of achieving a high induction in the region of the membranes 14 formed of aluminum plates, but in FIG. 6 a different arrangement is preferred. In the latter, by means of independently activated coils in the upper and lower part, opposing magnetic poles are created, which push each other apart and thus cause a displacement of the plates (membranes). For this purpose, two layers in the space between the membranes are positioned one on top of the other. There exists a boundary 40, and toward this boundary the two coils are shaped identically. Each turn of the coil corresponds to a turn of the other coil positioned lower. The opposite polarity of the coils is important; in one coil the current moves in one direction, in the other coil in the other direction, in such a manner that in the gap between the adjoining turns of the coil, equal poles are created, repulsing each other. In FIG. 6 the positive connection displayed as the upper band 33 of the one coil and the equally named but opposing connection as copper band 34 of the other positioned below it. Other connections that may be utilized are not shown.

Figure 7A:
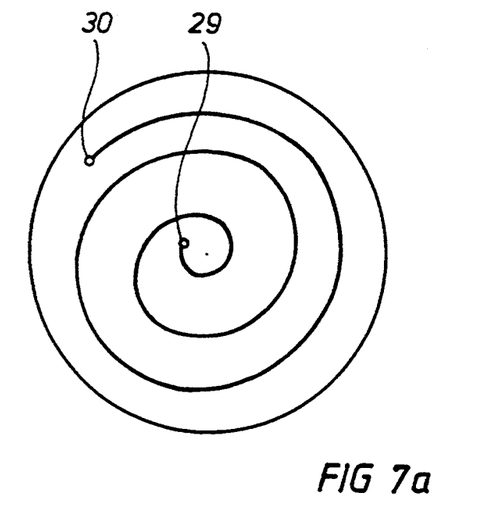
FIG. 7a shows a widening of a spiral coil for the acoustic pulser of FIG. 3.
Figure 7B:
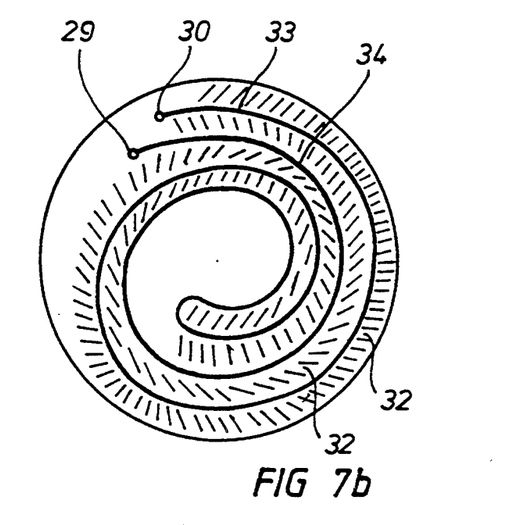
FIG. 7b shows the design of a bifilar coil for the pulser of FIG. 5.

Both coils are wound or spooled either according to FIG. 7a as a single spiral, or according to FIG. 7b as a bifilar coil. Similarly, it is possible to construct it according to FIG. 7b and add a ferro-magnetic strip to improve the inductivity, as shown in the case of ferro-magnetic tape in FIG. 5.

In this arrangement the opposing membranes are again driven in a push/pull mode, i.e. in one period, one repulsion and one attraction occur.

Figure 7C:
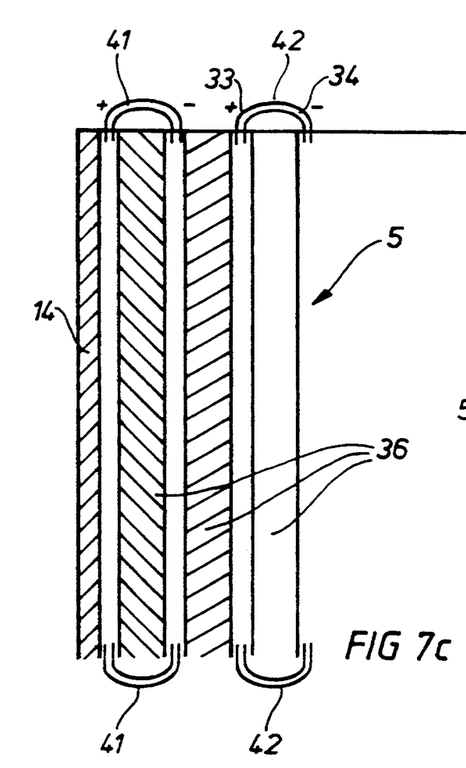
FIG. 7c shows the design for parallel comb-like widening of a coil, shown in FIG. 6.
Figure 8:
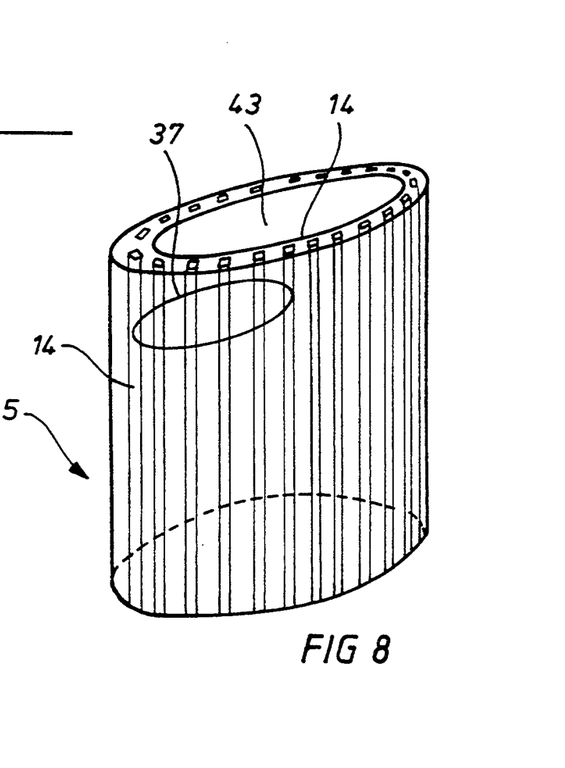

FIG. 7c shows a configuration of coils with flat adjoining layers positioned on a flat plane, while FIG. 8 shows the arrangement of coils (spiral) along the mantle of a cylinder. For purposes of clarity, in FIG. 6 the upper coil is designated 41 and the lower coil 42.

FIG. 7c shows the coils arranged near the chassis surface of the half-chassis mounted in a plane facing each other over a gap, and only shows the upper layer of each coil. In the lower plane of FIG. 7c, each oppositely poled coil 42, 41 under the coil 41, 42 is shown.

Each single coil can be individually connected and separately driven by the power supply, or alternatively, if desired, the coil can be connected in a meandering fashion, i.e., the coil end of coil 41 is, for example, connected to the coil-start of coil 42, etc. Between the coils, means may be used to increase inductivity, such as the use of ferro-magnetic cores, or it may be done by altering the distances between or the dimensions of the coils. The ferro-magnetic cores 36 are either of iron or of cores saturated with ferro-magnetic powder.

FIG. 8 shows that the coil arrangements using sandwich-like layered and oppositely poled coils 41, 42, can be placed along the mantle of a cylinder. The coil configuration of FIG. 7a, being shown planar instead may be curved to a cylindrical surface as shown in FIG. 8. Thus there exists an inner and an outer membrane 14 which are excited in a push/pull mode. In a further configuration it is proposed that the inner membrane 14 be prevented from oscillating by a solid core 43 in such a way that the oscillation generator acts on the outer membrane 14 only and, consequently, a better radiation of sound is achieved.

An object of the invention is to achieve a minimal acoustic energy density in the soil (rock), using high electrical power. For this purpose, the described special acoustic transmitter is suitable. However, the invention is not limited to the herein described transmitters but includes all acoustic transmitters that permit the induction of sufficiently high acoustic energy, or density in rock or soil. Instead of the inductive transmitters referred to, the invention may include hydraulic and mechanical transmitters, for example, using off-center drives or camshafts generating and oscillating movement in the surrounding ground. The frequency of the acoustic waves is chosen to achieve physical-chemical effect in sufficient distances from the acoustic transmitter in the soil/rock.

Figure 1A:
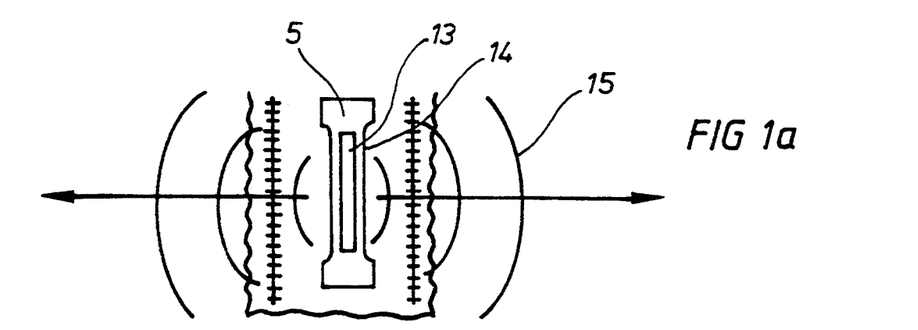
FIG. 1a is a view similar to FIG. 1 but with the apparatus turned 90° relative thereto.
Figure 1B:
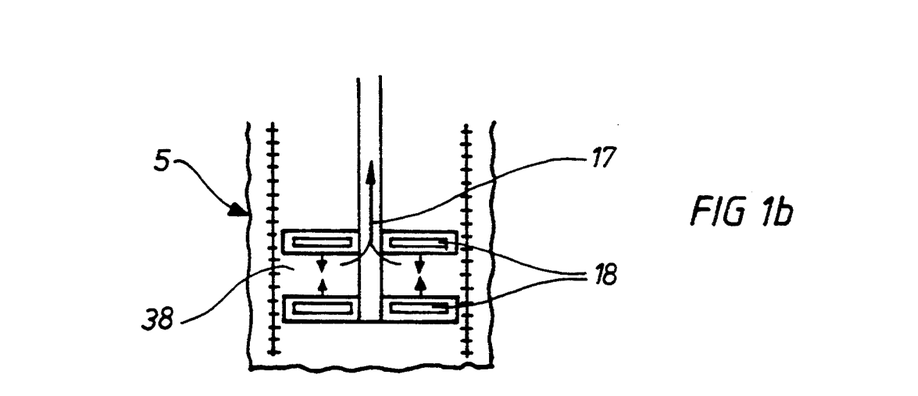
FIG. 1b is a view similar to FIG. 1 showing a different design in which the acoustic unit is an axial oscillator.

While the main borehole 1 is preferably a single round hole, the use of the invention is not limited to such an arrangement. The main borehole may be of any of various shapes, including a horizontally elongated hole, which in that shape is a trench. Such a trench is indicated at 1b in FIG. 1d. In the trench are a plurality of pulsers 5 positioned as shown in FIG. 1, and spaced equally along the trench. The supplementary holes 1a are shown along the side of the trench, also at equally spaced positions, between adjacent pulsers.

Figure 1C:
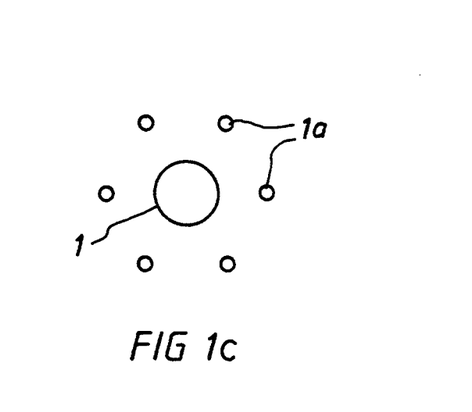
FIG. 1c is a diagrammatic view of a central borehole and a plurality of supplemental holes therearound.
Figure 1D:
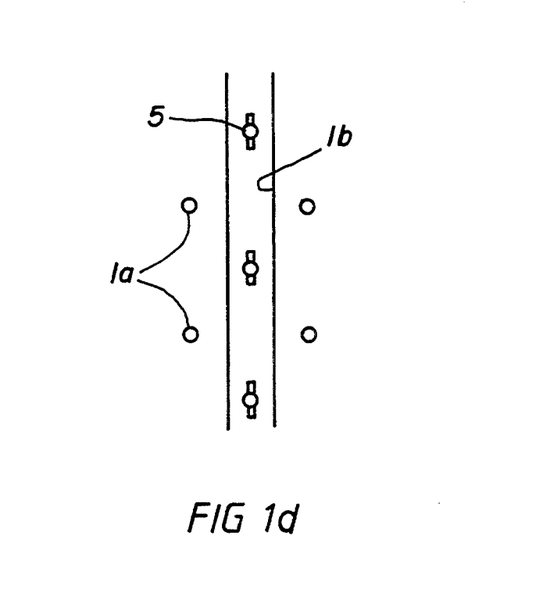
FIG. 1d is a diagrammatic view of a borehole in the form of a trench, and supplementary holes adjacent thereto.

In the arrangement represented in FIG. 1c, instead of injecting water under pressure, compressed air may be injected into the supplementary holes, assisting the flow of ground water into the main borehole. It is also possible to withdraw soil gas from the zone surrounding the main borehole.

In the case of both water injection, and extraction of soil gas, referred to, it is preferred to utilize the acoustic pulser. The acoustic pulser 5 is turned or rotated continuously during the operation, by rotating the drill stem or pipe 11, to obtain even distribution of the pulses over the surfaces of the whole borehole. The acoustic pulser may be movable along the drill stem, or with the drill stem, axially or vertically along the borehole, to transmit the pulses along the complete length of the borehole.

Following is a detailed description of various forms of the apparatus, and of wave forms, including the theory and main concepts of the operation of the device of the invention.

FIG. 1a shows the same acoustic pulser 5 as shown in FIG. 1, turned 90°. The acoustic pulser FIGS. 1, preferably effectively consists of two plate-like elements, i.e. the membranes 14, between which is a coil 13. In this form the acoustic waves 15 are transmitted perpendicularly to the opposing membranes 14 into the ground.

A direct bi-directional acoustic pulser is utilized preferably, for technical reasons, particularly since high acoustic densities can thus be obtained in the surrounding ground. It is also within the scope of the invention to use acoustic pulsers that transmit spherical waves, if a sufficiently acoustic density can be obtained in the ground. In this latter form the acoustic pulser is of spherical shape.

It is also possible within the scope of the invention, to use cylindrical acoustic pulsers. FIG. 1b shows another form of pulser, in which two pulsers located a relatively great distance and are opposed, work in a push/pull mode. In this arrangement the acoustic pulser 18 transmits acoustic energy axially so that the ground water in the space 38 between the pulsers is subject to a high pressure or a vacuum respectively and the ground water in this space or zone, is subject to pressurization and rarefaction, particularly intensely.

This arrangement and functioning force pressure waves into the ground, and pull suctional waves out of the ground, and the water in the space 38, which contains contaminants and poisons, is removed in the direction of the arrow 17 through the drill stem 11, and the pump referred to above.

Figure 2A:
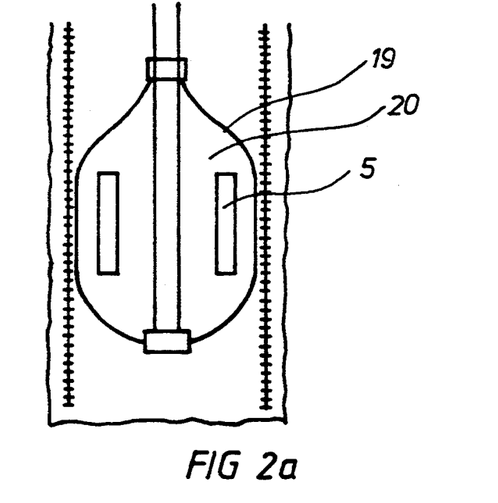
FIG. 2a is a view similar to FIG. 1 showing the acoustic pulser applied to the surface of the borehole by an infatable bag.
Figure 2B:
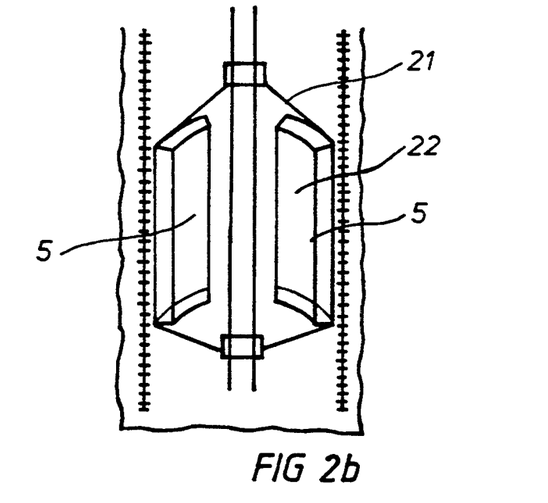
FIG. 2b is a view similar to FIG. 2d showing another form of means for applying the pulser to the wall of the borehole.

FIGS. 2a and 2b show different coupling mechanisms for connecting acoustic pulsers or transducers, such as shown in FIGS. 1-1b, to the wall of the borehole. In this arrangement, one or more acoustic transducers 5 are located next to a packer 19 which is filled with pressurized fluid and is of necessary pressure to expand the packer into position lying firmly and snugly against the inside of the filter or, where no filter is used, directly against the surface of the borehole. In this manner, good contact with the borehole wall is accomplished and the efficiency of acoustic energy propagation is increased.

A similar construction is shown in FIG. 2b where the acoustic pulsers 5 are located in the region of cylindrical segments 22 which can be spread out radially and be pressed against the inside of the filter by spring activated arms 21 or directly against the surface of the borehole. The extent of contact with the surface of the borehole or with the filter, is produced by the form of the springs of the arms 21.

It is also possible to utilize coupling mechanisms of pneumatic or hydraulic character, to move the pulser against this wall of the borehole.

FIG. 3 shows an initial configuration of an acoustic pulser 5. In this case the pulser consists of a flat casing that has either a square or rectangular base. It includes two flat, parallel chassis 39 set against each other with a gap therebetween. Each chassis includes a membrane 14, and in order to stabilize the membrane, the outer edges of the casing are thicker. Between the two parts of the casing is a frame 23 which is essentially a strip around the perimeter of the spacing that seals off the spacing between the two parts of the casing, completely.

A spiral coil occupies the spacing, this being shown in FIGS. 7a, 7b. This spiral coil consists of a single copper band 24 connected to a power supply with positive poles 29 and negative poles 30. A copper band spiral coil of this type is used for dimensional reasons, i.e., because of high currents. FIG. 3 is a section through such a spiral coil with a cross section of the copper band. The coil 13 is of spiral shape.

Use of cylindrical shape or wire having different cross sectional form, other than the band 24 shown here, may be used.

Preferably the height of the membrane may be less than the spacing defined by the space 23 between the plates, thus producing a spacing between the spiral coil and the membranes, above and below the membranes. The membranes 14 are made to vibrate in a push/pull mode.

FIG. 4 shows as an examples, a plot of a frequency curve of the output signal of the acoustic pulser 5, with a spiral coil shown in FIGS. 3, 7a, 7b.

In FIGS. 4 and 4a the amplitude of the respective membrane 14 is shown as a function of time. FIG. 4 shows a detail of the curve of FIG. 4a. The acoustic wave length 26 is selected in such a manner as to make physical-chemical reaction in the ground that is subject to the pulses noticeable. Trials conducted by the inventor have demonstrated the effectiveness of wave lengths of the order of 100 Hz to 10 KHz.

For efficiency reasons, the acoustic signal is projected into the ground in a pulsing mode, preferably, with the pulses being transmitted within certain repetitions times 25 shown in FIGS. 4, 4a. The wave form 31 of the acoustic output signal is shown in these figures.

Following the foregoing description of the specific apparatus utilized and the functioning thereof, it is desired to set out broad concepts and generic scope of the invention.

The high energy acoustic pulses speed up physical-chemical processes in the ground, assists in cleaning the filters in the boreholes or wells as well as in perforated casings therein, to clean off incrustation and remove fine particles in the pores in the immediate vicinity of the borehole.

As referred to above, water may be introduced into the supplementary holes 1a under pressure, but it is also in the scope of the invention to introduce air under pressure instead, and to introduce water in certain of the holes and air in others, resulting in a bubbly mixture of air and water flowing into the main borehole 1.

It is to be considered that if soil is to be decontaminated in an area above the natural water table, water may be introduced under pressure in the supplementary holes 1a (FIG. 1c), which then flows through the ground into the main borehole.

It is also within the scope of the invention to place the acoustic pulsers flat on the surface of the ground, although the depth of penetration in this case is limited. This method also would be used only when the depth of the contamination is limited.

It is not necessary that the supplementary holes or shafts 1a, be of the same depth as the main borehole.

The invention finds particular adaptability in the case of highly volatile halogenated hydrocarbons having specific gravities higher than water, and low solubility. High concentrations of these substances can accumulate particularly in the usually uneven surface of the lower boundary of the aquifer, this also occurring in the liquid phase. In this case the low current velocities of the ground water, in the area surrounding the borehole, delays the production of the highly volatile halogenated hydrocarbons. Even after the removal of the greater part of the contamination, a residual saturation remains that can only be removed with difficulty over long periods of time, especially from small pores and for example, clay layers. The ground vibration provided by the acoustic pulses of the invention accelerates the removal of the contaminates.

Examples of hydrocarbons that can be effectively treated by the invention, include LHKW and HKW, as well as trichloroethane and tetrachlorethane. These halogenated hydrocarbons have a specific gravity greater than that of water.

Purpose and Principle of the Ground Vibrator:

The pulser also constitutes a vibrator and achieves the results: (1) it produces a relative movement between the solid soil matrix and the fluids confined therein. The phase boundaries of the fluids become enlarged relative to their common surface area at equilibrium conditions, and due to the enlarged contact surfaces, at a constant rate of solubility, a greater amount of highly volatile halogenated hydrocarbons can be dissolved in water per unit time and subsequently removed by the well-known stripping process; (2) highly volatile halogenated hydrocarbons already dissolved in water are transferred to the gas phase by pseudo-cavitation effected by the acoustic waves. The bubbles created in this step are produced with the water, or pumped out with the air from the partially water-saturated zone or area into which they escape from the ground water.

Application of the Ground Vibrator:

In the use of the apparatus, the surrounding conditions are surveyed, noting concentrations of contaminants, the quantity of ground water, and the direction and velocity of flow of the ground water, as well as the concentration of the contaminants. The main borehole is preferably of course drilled in the center of the contaminated area. In this survey, the level is determined, of the greatest concentration of contaminants and the pulser positioned at that level, as closely as is practicable. If it is found that treatment should be given at different levels, then that step will be followed. It is also possible to utilize a plurality of pulsers, in vertically spaced positions.

Effect of Acoustic Decontamination:

The acoustic waves disturb the dynamic equilibrium between the ground water and the contaminants. The ground water/contaminants tend to reach a new equilibrium, and do so depending on geological conditions. With conservation of energy observed, a new period of vibrations should be utilized, just prior to the new equilibrium being reached. This is achieved by a pulse timer logic regulating an ON/OFF switch as required by local conditions.

Specifications of Portions of the Apparatus:

Signal Level of the Pulser=100%.

Distance of 50% limit of above signal: 3–8 m, depending on soil type.

Effective radius axially from the pulser coil: in ground water up to 10 m in air up to 5 m Best pulse rate: about 50 per second.

Duration of 1 vibration cycle: about 10–60 minutes.

Various substances and conditions are treated by the apparatus of the invention; all poisonous substances soluble or partially soluble can be removed from the soil; also, in addition to the halogenated hydrocarbons, the materials benzol, gasoline, solvents, e.g. perchloroethylene, tensides, fats, as well as substances that occur both soluble in water as in the gaseous state, as well as all highly volatile chemicals.

Fluid droplets of contaminants are better soluble in ground water due to vibrations, because of the reduction of the surface tension. Additionally portions of the contaminants already dissolved in the ground water are set free.

The effects of the pulses and vibrations also are related to different polarities of many contaminants. The so-called Helmholtz potential exists on the surface of the soil matrix, and the vibration creates a relative movement between the fluids in the soil and the solids which carry the Helmholtz potentials, it being noted that due to these potentials the fluids are bound to the soil. The transition of the dissolved contaminants into producible gas bubbles due to pseudo-cavitation is multiplied by the vibration up to 100 times.

Function description:

The complete system may be referred to as a vibrator, including two panel racks, a power supply and control unit, as well as the pulse transmitter. The transmitter includes a coil wedged between aluminum plates, the latter forming a base frame, and being tapered toward the center, each forming a membrane, effectively functioning as a loud speaker. This is activated by current pulses by some 1000 amperes lasting between 0.5 and 1 millisecond. The current surge is produced by the discharge of a capacitor by means of a thyristor. The total power consumption is 7 kW, the power output is 5 kW, i.e., 5 kW of electric energy is supplied to the acoustic transmitter.

Pulse Generator:

Basically the dynamic effect between two parallel conductors is utilized. In this arrangement, the mutually repulsive reaction of two conductors made of copper, for example, is of major but not exclusive significance.

Under Ampere's Law for the force K in a vacuum:

$K = (1) * I/r(2) * 10^7$ where,
 l = length of conductor
 r = distance from conductor
 I = electric current
 * = multiplication sign In order to achieve the highest possible effect in soil/rock, high pressures and large volume displacements are necessary. The effect of he force is inversely proportional to the square of the distance between the individual conductors. Large forces can therefore be utilized for short distances in order to move a sufficient large volume. In spite of this, it becomes necessary to activate large surfaces. The masses involved should however remain small in order that vibrational frequencies of several kilohertz may be produced.

A suitable design of the acoustic pulser is a metal membrane in plate form which is activated by a conductive coil and high currents. In order to avoid reactive forces on the coil, the coil acts on two symmetrically placed membranes simultaneously. Such an arrangement is in the form of a sandwich: membrane 1—coil—membrane 2, can be made to fit the space available as formed by a plane surface or curved surface, like the mantle of a cylinder. Parabolic forms are also successfully employed for focusing acoustic signals.

It is of importance for the design of the coil that it be flat, have a large diameter, and as many turns per unit area. The desired frequency of pulses and high currents result in low resisitivities. Copper strip of e.g. 20*0.5 mm are the most suitable for winding single-layer coils of a few decimeters in diameter.

Two effects differing in principle cause the membrane to repel or attract.

(X) The membrane is a good conductor, and light in weight, e.g. made of aluminum, and is of several mm in thickness, It can be conical, planar or of wave form to fit its natural oscillation. If a current of several hundred to over one thousand amperes is put through the coil a counter-current will be induced in the conductive membrane, and this being a function of the variation of the current with time (di/dt). Initially both membranes are propelled outwardly to be drawn back in with the collapse of the electromagnetic field.

(Y) If ferro-magnetic materials are introduced into the system of coil/membrane, the coil with ferro-magnetic content and the membrane are by design intermeshed.

(Y1) If a membrane is made of ferro-plastics and adjacent conductors given the respective opposite polarity, opposite magnetic poles result in the conductors between the ferro-magnetic ribs, this forcing the membranes apart.

(Y2) With the use of iron the effects of (X) and (Y1) are combined.

Good transmission of acoustic energy from the acoustic pulser into the soil or rock surrounding the borehole is assured by the presence of ground water at a sufficient depth. In a dry borehole, oil or water filled packers pressed to the wall of the borehole are proven. If the acoustic pulser is in the form of the segment of a cylinder, it may be pressed directly against the wall.

The efficiency of subjecting the ground to acoustic pulses depends strongly on the pulse frequency and the repeat frequency of individual bursts. Depending on the type of soil or rock and e.g. particle size, the frequencies chosen are:

pulse frequency 100 to 3000 Hertz repeat frequency 1 to 100 Hertz (FIG. 4) = span between pulse maxima (repeat of individual pulses).

While the pulses are being generated and impinged into the ground, the ground water and/or air or gas is being pumped out of the borehole.

During the inactive periods of a pulser, the pulse generator can be used in other locations.

Design form:
 (X)
 planar
  cylindrical or focused
 (Y)
 planar
  spiral form
  concentric, parallel
 cylindrical
  spiral form
  concentric, parallel

I claim:

1. Apparatus for use in an open borehole in the ground having interstices exposed in the borehole, and extending below the level of the ground water, wherein the ground water is enabled to percolate into the borehole, the apparatus being operable for removing halogenated hydrocarbon contaminants from the ground water in the borehole, the apparatus comprising,
  a pipe extending down into the borehole to a position below the surface of the ground water,
  a pulser mounted on the lower end of the pipe, and operable for producing acoustic pulses and transmitting them transversely into and through the ground in dispersing relation,
  the pipe being movable and adapted to be operably connected with means for selectively positioning the pulser,
  the pipe being capable of being operably connected with a pump exteriorly of the borehole for pumping water therethrough from the borehole, and
  the apparatus also including an electrical cable operably connected with the pulser and with operating control means exteriorly of the borehole.

2. Apparatus according to claim 1 and including,
 means for positioning the pulses selectively at different vertical positions along the stem.

3. Apparatus according to claim 1 and including,
 a pair of pulsers mounted on the stem coaxially thereof and in spaced relation along the axis,
 the pulsers forming a space therebetween accommodating ground water therein,
 the pulsers are operable in push-pull mode in axial direction relative to each other, and thereby operable for transmitting acoustic energy axially to the ground water in said space, and
 the apparatus is operable for pumping the water in said space from the borehole.

4. Apparatus according to claim 1 wherein,
 the pulser includes membranes which produce acoustic pulses and are spaced apart on a transverse axis and operable for producing acoustic pulses and transmitting them transversely along said transverse axis into and through the ground, the pulser also includes upper and lower separately modulated magnetic coils with respectively opposed poles, and the apparatus includes means for producing reaction between poles and thereby causing the membranes to so vibrate and produce pulses.

5. Apparatus according to claim 4 wherein, the pulser includes either a flat casing or a cylindrical casing containing said magnetic coils.

6. Apparatus according to claim 1 wherein, the pulser has a frequency in the megacycle range of between about 100 Hz and 10 KHz.

7. Apparatus according to claim 1 wherein, the pipe is rotatable about its vertical axis, and is adapted for operably connected with means for rotating it and thereby selectively positioning the pulser angularly about said axis.

8. Apparatus according to claim 1 and including, a filter screen in the borehole and extending downwardly from the surface of the ground water, and adapted to be fitted against the wall of the borehole, the pulser is surrounding by the filter screen, a hydraulic pressure bag adjacent the pulser, and means for activating the pressure bag for forcing the filter screen snugly against the wall of the borehole.

\* \* \* \* \*